(12) United States Patent
Zellweger

(10) Patent No.: US 6,433,797 B1
(45) Date of Patent: Aug. 13, 2002

(54) METHOD AND APPARATUS FOR GENERATING A TAB LIST MENU IN A HIERARCHICAL MENU STRUCTURE

(76) Inventor: Paul Zellweger, 82 Fresh Pond La., Cambridge, MA (US) 02138

( * ) Notice: Subject to any disclaimer, the term of this patent is extended or adjusted under 35 U.S.C. 154(b) by 0 days.

(21) Appl. No.: 09/353,433

(22) Filed: Jul. 15, 1999

Related U.S. Application Data

(60) Provisional application No. 60/095,811, filed on Aug. 4, 1998.

(51) Int. Cl.[7] ................................................ G06F 3/00
(52) U.S. Cl. ..................................... 345/762; 345/825
(58) Field of Search .............................. 345/700, 744, 345/762, 764, 777, 810, 825, 826, 841, 853, 854, 968; 707/100–102, 103 R, 103 Y, 103, 103 Z, 104.1

(56) References Cited

U.S. PATENT DOCUMENTS 4,899,377 A * 2/1990 Bauer et al. ................ 379/354
5,041,967 A * 8/1991 Ephrath et al. .............. 345/825
5,261,042 A * 11/1993 Brandt ........................ 345/841
5,483,651 A * 1/1996 Adams et al. ................. 707/1
5,627,980 A * 5/1997 Schilit et al. ................ 345/841
5,630,125 A * 5/1997 Zellweger ................... 707/103
5,745,716 A * 4/1998 Tchao et al. ................. 345/777
5,999,228 A * 12/1999 Matsuura et al. ........... 348/569
6,131,100 A * 10/2000 Zellweger ................. 707/104.1
6,279,005 B1 * 8/2001 Zellweger ................... 707/101

* cited by examiner

*Primary Examiner*—Crescelle N dela Torre

(57) ABSTRACT

Hierarchical menus provide end-users with an easy way to locate information. The underlying hierarchical menu structure is often scalable as there are no limits on the number of entries in a list menu. Yet, this feature is rarely used, if at all, because it can be very impractical for the end-user. As a list menu can contain hundreds, if not thousands of entries, scrolling for a particular entry can be extremely tedious. The present invention discloses a menu authoring system component that enables a developer to generate and build a tab list menu. The tab menu divides a target list menu into tab intervals that can include a specified number of letters or full words. The present invention discloses an interactive configuration window and the program logic that enables a developer to specify settings for these tab menus.

20 Claims, 10 Drawing Sheets

| NODE | TOPIC | TAG | PARENT | CHILD | SIBLING | KIDS | LEVEL |
|---|---|---|---|---|---|---|---|
| 30 | [ root node ] | 0 | NULL | 31 | NULL | 4 | 0 |
| 31 | Author | 1 | 30 | 35 | 32 | 1204 | 1 |
| 32 | Language | 2 | 30 | 39 | 33 | 8 | 1 |
| 33 | Subject | 3 | 30 | 41 | 34 | 12 | 1 |
| 34 | Title | 4 | 30 | 45 | NULL | 1231 | 1 |
| 35 | Abdul-Hak, Selim | 100 | 31 | B | 36 | 0 | 2 |
| 36 | Ackerman, James | 101 | 31 | C | 37 | 0 | 2 |
| 37 | Acland, James | 102 | 31 | A | 38 | 0 | 2 |
| 38 | Adeline, Jules | 103 | 31 | D | ... | 0 | 2 |
| 39 | English | 50 | 32 | 49 | 40 | 703 | 2 |
| 40 | German | 51 | 32 | 52 | ... | 118 | 2 |
| ... | ... | ... | ... | ... | ... | ... | ... |
| 48 | Zwischen Kunst und In[d] | 1004 | 34 | D | NULL | 0 | 3 |

Prior Art

Fig. 5

METHOD AND APPARATUS FOR GENERATING A TAB LIST MENU IN A HIERARCHICAL MENU STRUCTURE

CROSS REFERENCE TO RELATED APPLICATION

This application is based on Provisional Application No. 60/095,811 entitled Method and Apparatus for Generating Tabs in a Content Menu Using an Open Hierarchical Data Structure, filed Aug. 4, 1998 abandoned.

REFERENCES

| U.S. Patent DOCUMENTS | | |
|---|---|---|
| 6,279,005 | 8//01 | Zellweger |
| 6,131,100 | 10/00 | Zellweger |
| 5,999,228 | 12/99 | Matsuura et al |
| 5,745,716 | 4/28/98 | Tchao et. al. |
| 5,630,125 | 5/13/97 | Zellweger |
| 5,627,980 | 5/97 | Schilit et al |
| 5,483,651 | 1/96 | Adama et al |
| 5,261,042 | 11/93 | Brandt |
| 5,041,967 | 8/91 | Ephrath et al |
| 4,899,377 | 2/90 | Bauer et al |

Other References

Zellweger, Paul. "Web-based Sales: Defining the Cognitive Buyer." *International Journal of Electronic Markets.* Vol. 7 No. 3, 1997. pp. 16–22.

Zellweger, Paul. The Knowledge Tree. unpublished paper, copyright ArborWay, Inc. Cambridge, Mass., Jan. 3, 1998.

FIELD OF INVENTION

The present invention relates to computer software used to build and maintain a menu system and, more specifically, it relates to a menu management system that enables a developer to generate a tab list menu and link it to an existing menu system.

BACKGROUND

A hierarchical menu system organizes information under a series of nested topics, so end-users can navigate down its lists to the reach information they need. Help systems represent, perhaps, the most prevalent and easily recognized application of this type of menu. Yet, prior to Zellweger (U.S. Pat. No. 5,630,125), menu paths in these systems have always been mutually exclusive because all prior menu authoring system art was based on the binary search tree. Zellweger's authoring system and its underlying data structure, the open hierarchical data structure art, on the other hand, enables multiple paths to reach the same information.

In a menu authoring system the underlying data structure organizes information and arranges its descriptive topics into a series of nested lists and paths. This includes data structures like the binary search tree, as well as Zellweger's more flexible structure. When the menu developer is ready to build a hierarchical menu system, the data structure, again either a search tree or Zellweger's structure, transforms these lists of nested topic lists into menu data used by the display system.

As these data structures are often scalable, there is no limit on the number of items in a topic list. Yet, these lists never grew too large, until U.S. Pat. Nos. 6,279,005 & 6,131,100 by Zellweger, because all data entry was made by hand. Zellweger's disclosures show how to automatically generate networks of lists and paths from external sources of data such as database structures and specially prepared files. These methods automatically propagate Zellweger's structure and thereby overcome a prior obstacle, expensive and labor intensive data entry.

Mapping database values into a menu data structure in a automatic fashion creates new challenges for its menu end-users, especially when these list menus can get exceptionally large. Previously, the number of entries in each list menu was under a degree of control because it was always built by hand. Automation removes this level of control, and produces list menus that can contain hundreds, if not thousands of entries that make scrolling for a particular entry extremely tedious. To combat this problem, the present invention discloses ways to automate the generation of a tab list menu that in many respects, corresponds to a thumbnail tab in a book, its paper counterpart.

Tchao et. al (Apr. 28, 1998 U.S. Pat. No. 5,745,716) discloses a type of electronic tab displayed on a monitor of a hand-held computer device. Each tab represents a subset of items in a larger list. The user interface includes a display of the complete set of tabs and the capability of selecting a tab and cycling through items corresponding to the selected sublist. In contrast, the present invention is dedicated to a totally different type of user interface, nested list menus in a content menu, and a different retrieval objective, organizing information to link directly to each object.

SUMMARY OF THE INVENTION

The present invention discloses a menu authoring system that generates a tab list menu that links to a set of sublists which, previously, represented one long continuous list of menu items. With the present invention the menu developer has full control over how the original list is divided into intervals and how the tab menu list portray these divisions. Using an interactive configuration window the developer selects the source for these divisions, an alphabet list or the content itself, and can display the tab list menu prior to making permanent changes to the menu structure. The menu developer is free to select any list in a menu structure as a candidate for a tab list menu. When the new tab list menu is generated the present invention links this menu to the prior incoming and outgoing list objects.

BRIEF DESCRIPTION OF THE FIGURES

FIG. 5 depicts the prior art of the database structure used to represent node information in the open hierarchical data structure.

DETAILED DESCRIPTION OF THE FIGURES

To illustrate the present invention a menu system representing a collection of books will be used. At the upper-most level of the menu system four major topics are presented: authors, languages, subject, and titles. Under languages and subjects, topics links to a one or more sublists that narrow the subject material. This network of topics represents the primary distinctive feature of the content menu, allowing multiple ways of locating the same thing.

Figure 1:
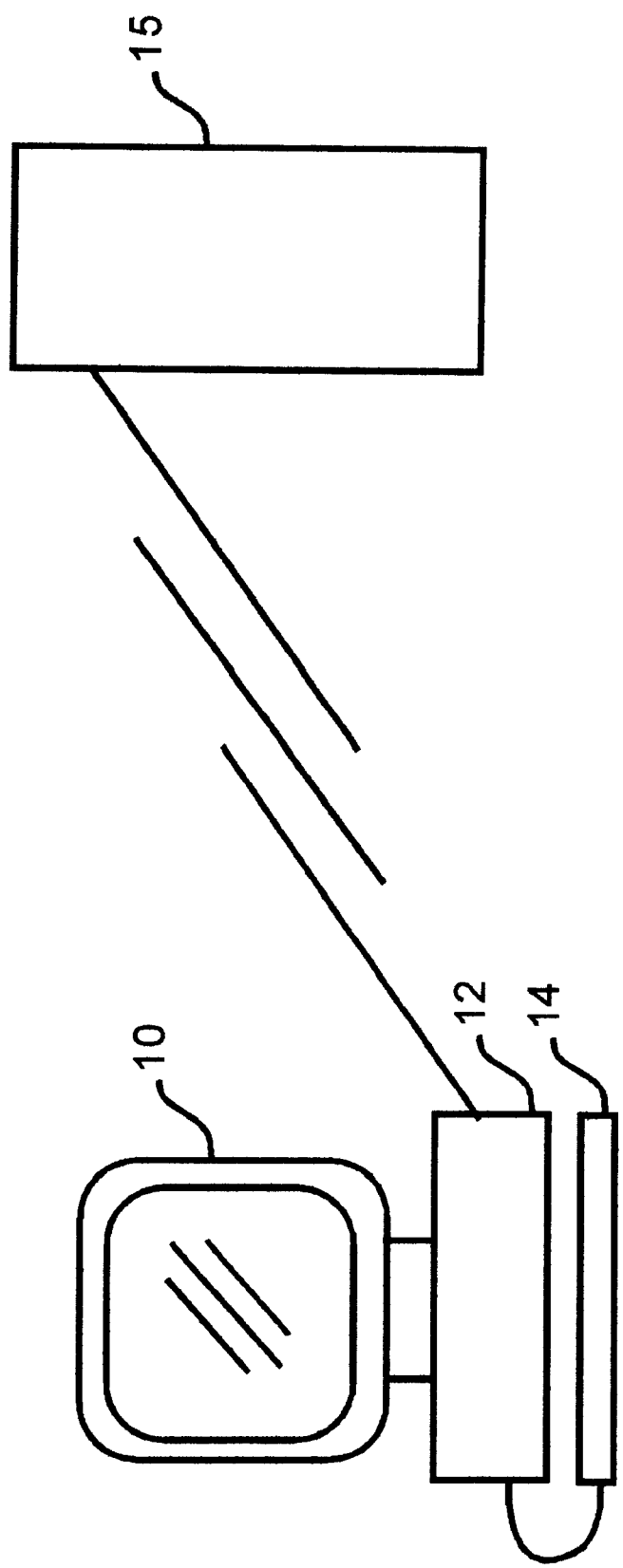
FIG. 1 depicts the network apparatus of the present invention.

FIG. 1 depicts the desktop computer apparatus 12 of the present invention that includes a monitor device 10 and an input keyboard device 14. In one embodiment of the present invention a menu developer builds content menu tabs of the present invention on computer 12 in a stand-alone setting. In another embodiment of the present invention the developer to builds a tab list menu on a server computer 15 from client computer 12.

Figure 2:
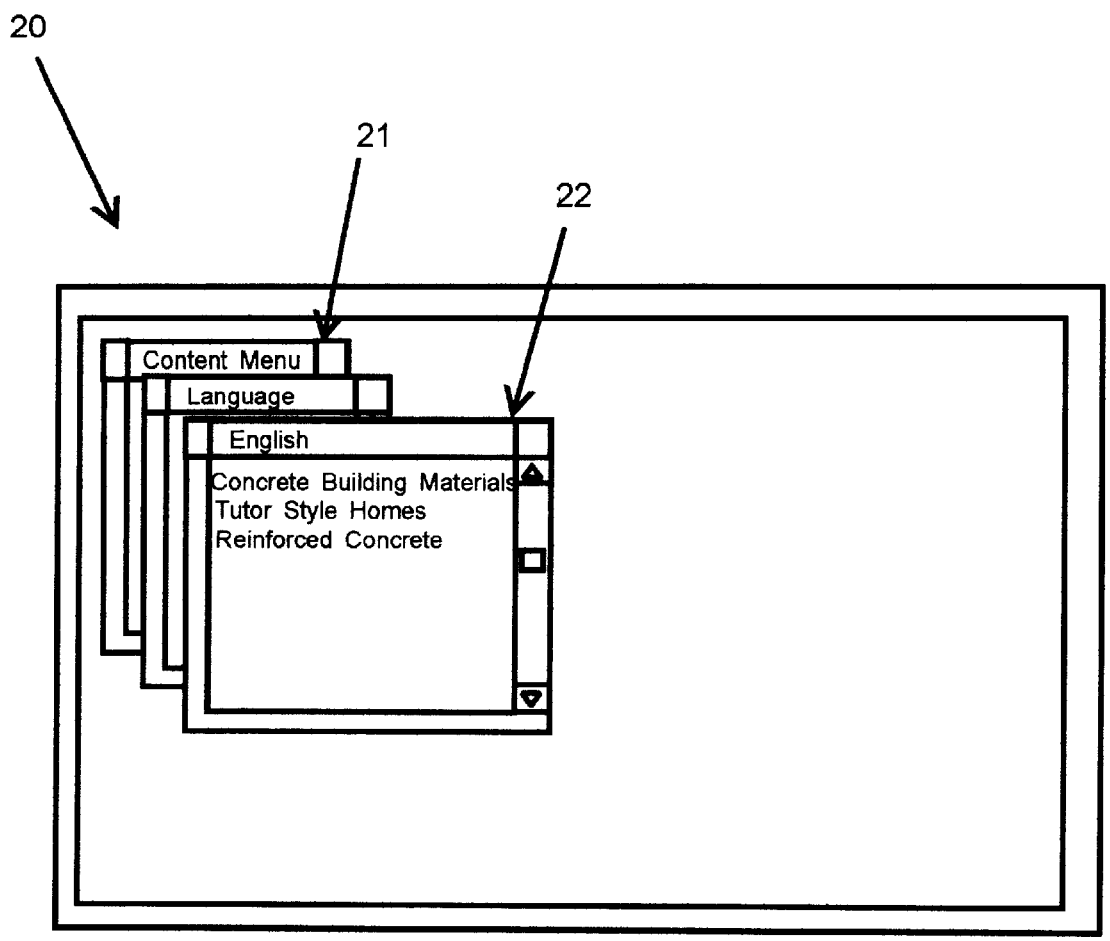
FIG. 2 depicts a graphical representation of the prior art of the content menu user interface.

A graphic representation of the prior art of the user interface known as a content menu 21 is depicted in FIG. 2. Monitor 10 displays the content window 20. The content menu 21 includes one or more nested list menus. Each list menu 22 in 21 includes at least one menu entry, a menu title, and a scrolling device if needed. Each time the end-user selects an entry in 22 that content menu 21 either displays the next list menu 22 or an information object at the end of a menu path. Note, that from the end-user's perspective, content menu 21 works just like any other hierarchical menu system.

Figure 3:
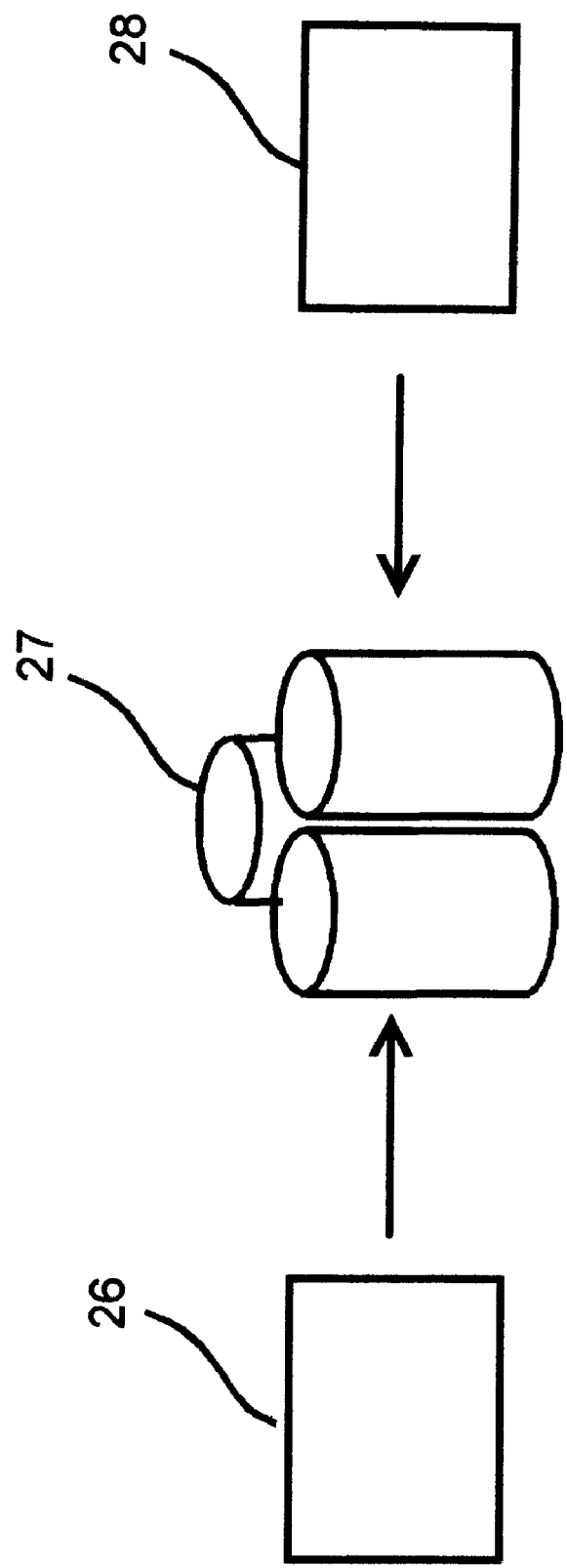
FIG. 3 depicts the three major software components of the prior art of the content menu.

The three primary software components of the prior menu art are depicted in FIG. 3. This includes an authoring system 26, menu files 27, and software components 28 that access menu files 27 and display content menu 21.

The authoring system 26 represents the software used to build and maintain a hierarchical menu structure and to generate menu data files 27. Advances brought about by the present invention represent major improvements to the prior art of authoring system 26.

Figure 4:
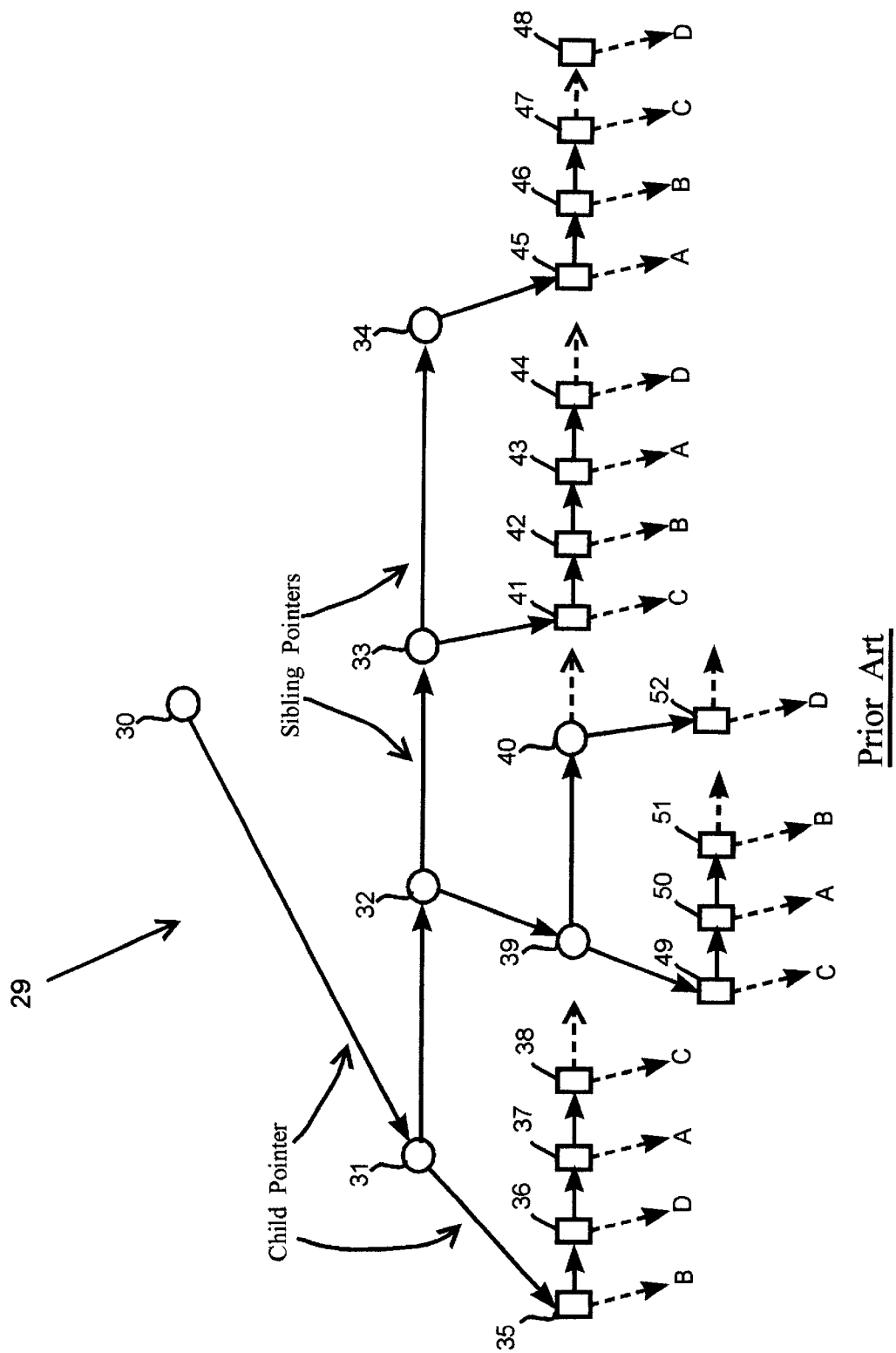
FIG. 4 depicts a graphical representation of the prior art of the open hierarchical data structure.

The open hierarchical data structure 29, depicted in FIG. 4, represents a specific type of hierarchical menu structure art. It includes a single root node 30, one or more internal nodes known as branching nodes such as node 31, and one or more data nodes that link to an information object such as node 48. Generational terms, such as parent child, and sibling, are used to describe elements in structure 29 and how they relate to each other. Once again, the distinctive feature of 29 is that it allows more than one paths to reach an information object at the bottom of the structure.

Each node in structure 29 has a outgoing arc or child pointer that flows either to a child or an information object. As a child node can be located anywhere below root 30 in structure 29, each nonroot node can have more than one parent node that includes a primary and one or more step-parents.

Each node in structure has a topic or an information key that corresponds to a entry in a list menu. The sibling pointer produces a sibling list that corresponds to a list menu. A child pointer links a list menu entry to an offspring list menu or to an information object.

Structure 29 can represent complex hierarchical networks that enable multiple paths to reach the same information object, as well as mutually exclusive pathways found in conventional menu structures. Therefore, alternative embodiments of the present invention include applications of program logic that can be applied to any structure that can be depicted by 29, including a binary search tree, the hierarchical structure typically associated with nested list menus.

The preferred teachings of the prior art use elements in database structure 60, depicted in FIG. 5, to represent information about each node in structure 29. This includes node id 61, topic in 62, child pointer 65, and sibling pointer 66. The database structure 60 also includes an end-user tag in 63, a pointer to a primary parent in 64, the number of children nodes in kids 67, and the node's level in the structure in 68.

Figure 6A:
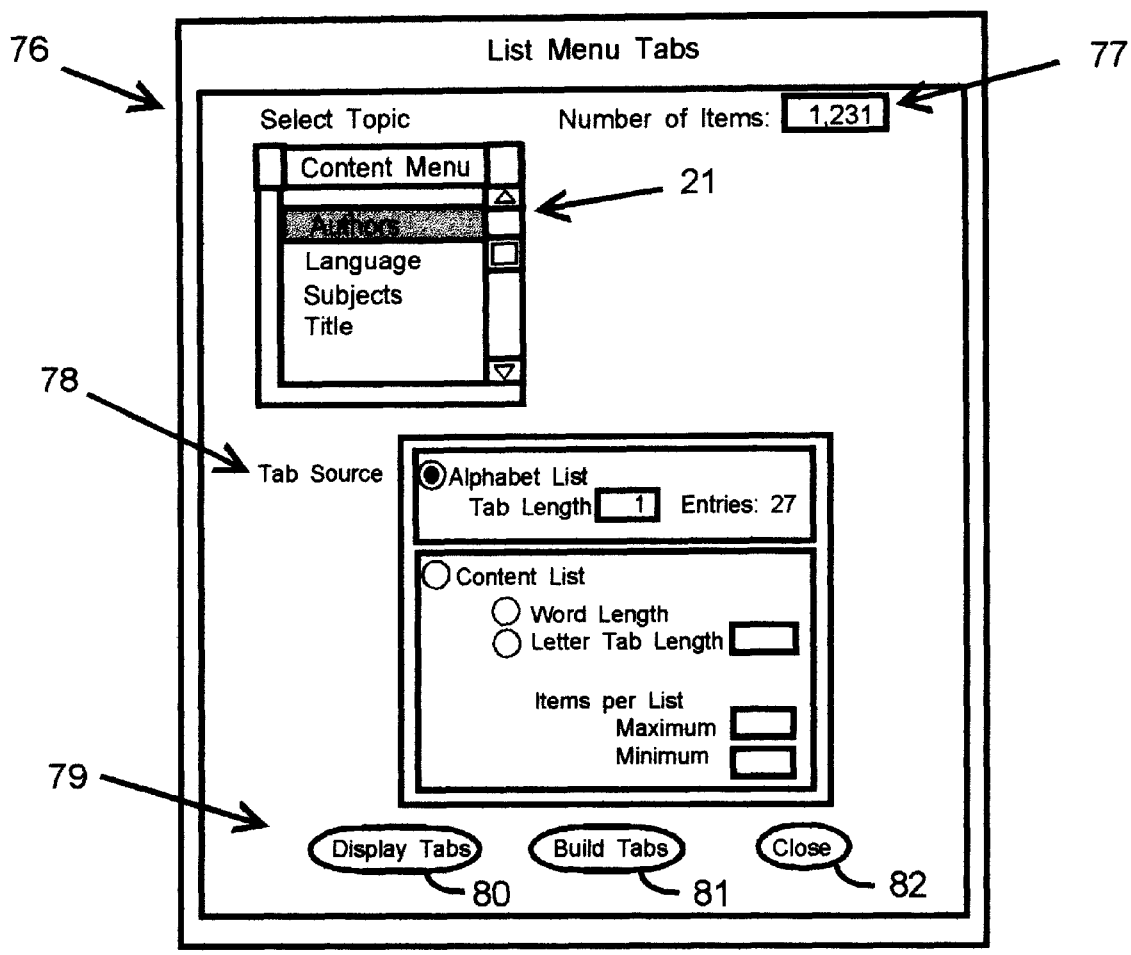
FIGS. 6a and 6b depict the interactive user interface of the configuration window in the present invention employed by a developer to generate a tab list menu.

In the present invention, authoring system 26 also includes configuration window 76, depicted in FIG. 6, that enables a menu developer to specify tab list menu settings and generate the tab list menu for content menu 21. First, he or she navigates content menu 21 in window 76 to select a menu entry that points to a target list menu. Note that any list menu in 29 can be a target list menu including a tab list menu. Each time an entry in 21 is highlighted, the number of items in its successor or offspring list is displayed in field 77.

After the developer selects a target list, he or she selects a radio button in 78 to designate the source for the tab list menu. This can be either an Alphabetical List or the target list menu, identified as a Content List.

Under the Alphabetical List option in 78 the developer can select the length of each tab. In the example given in FIG. 6a the length is set to one. This means there would be a single letter in each tab and there would be 27 entries in the list.

Under the Content List option in 78 the developer can specify a full word or length of letters for the first and last elements in a tab interval. In addition, the developer can specify the maximum and minimum number of entries in each tab list menu.

In region 79 of configuration window 76 the developer can display the tab list menu with button 80, make permanent changes to the menu structure with 81, and close window 76 with 82.

Figure 6B:
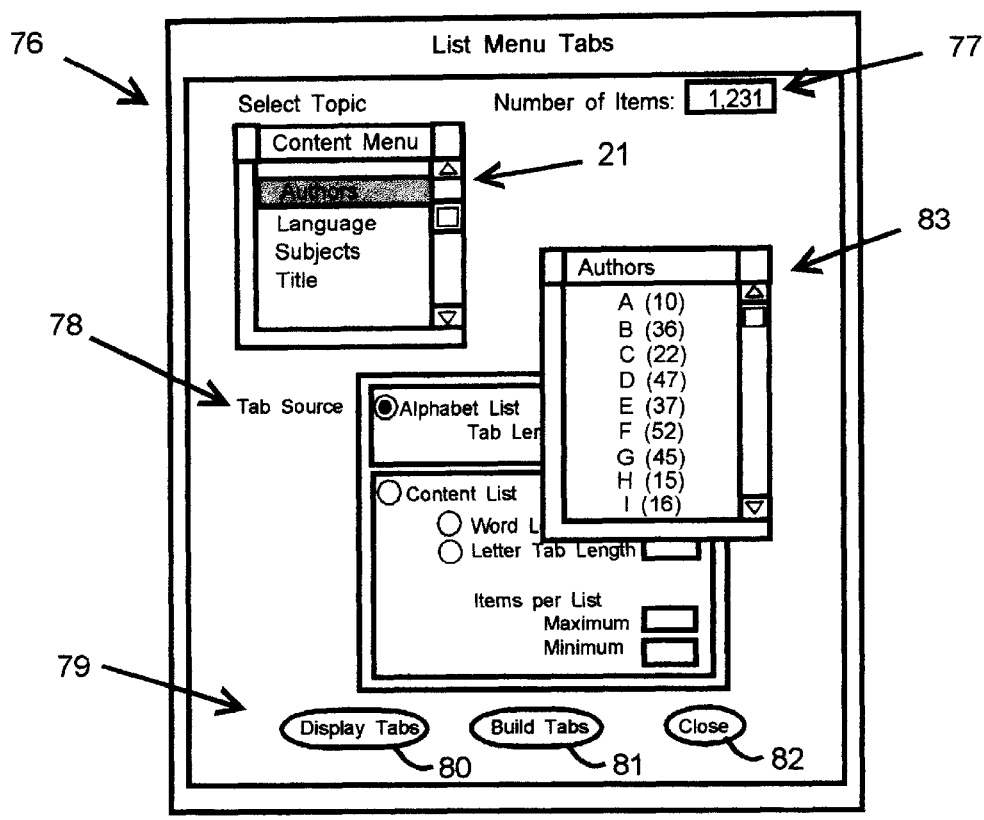

FIG. 6b depicts configuration window 76 after the Display Tabs button 80 was selected by the developer. In this example of the interactive capabilities of the present invention 76 generates and displays a sample tab list menu 83, from the settings in FIG. 6a, an alphabet list source having a single letter. Next to each entry in 83 is the number of elements associated with the alphabet letter interval. Note that the sample tab list menu does not alter an existing menu structure.

Figure 7:
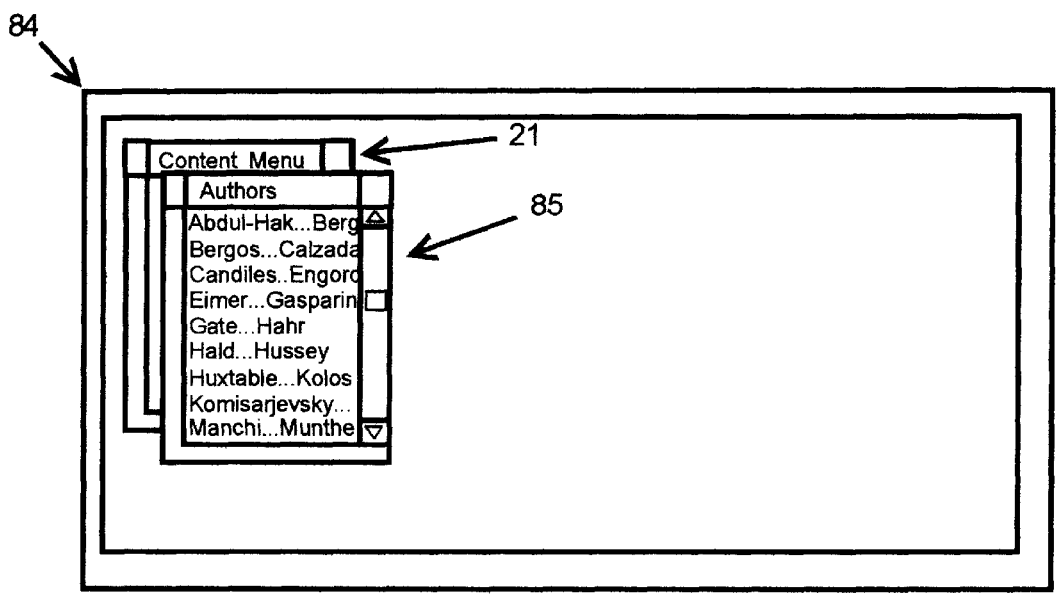
FIG. 7 depicts a graphical representation of a tab list menu generated by the present invention.

Window 84, in FIG. 7, depicts content menu 21 after a developer selected Build Tabs button 81 in window 76. Tab list menu 85 in 84 was built using the authors content list with a word length. Each tab entry in 85 depicts an interval using the author's last name as the first and last elements. So when an end-user selects the "Abdul-Hak . . . Berg" entry, the content menu generates a new list menu that starts with "Abdul-Hak" and ends with "Berg".

Figure 8A:
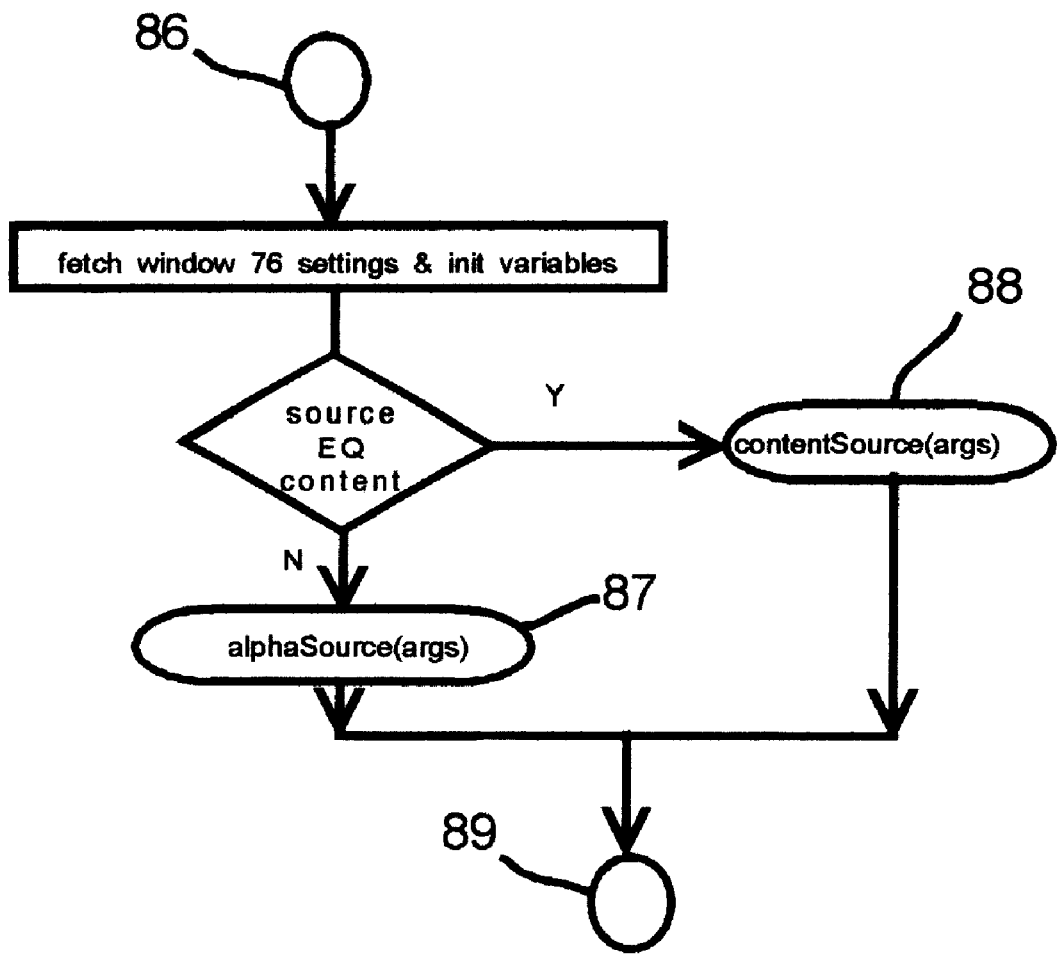
FIGS. 8a through 8c depict the flow chart of the program logic used to generate a tab list menu.
Figure 8B:
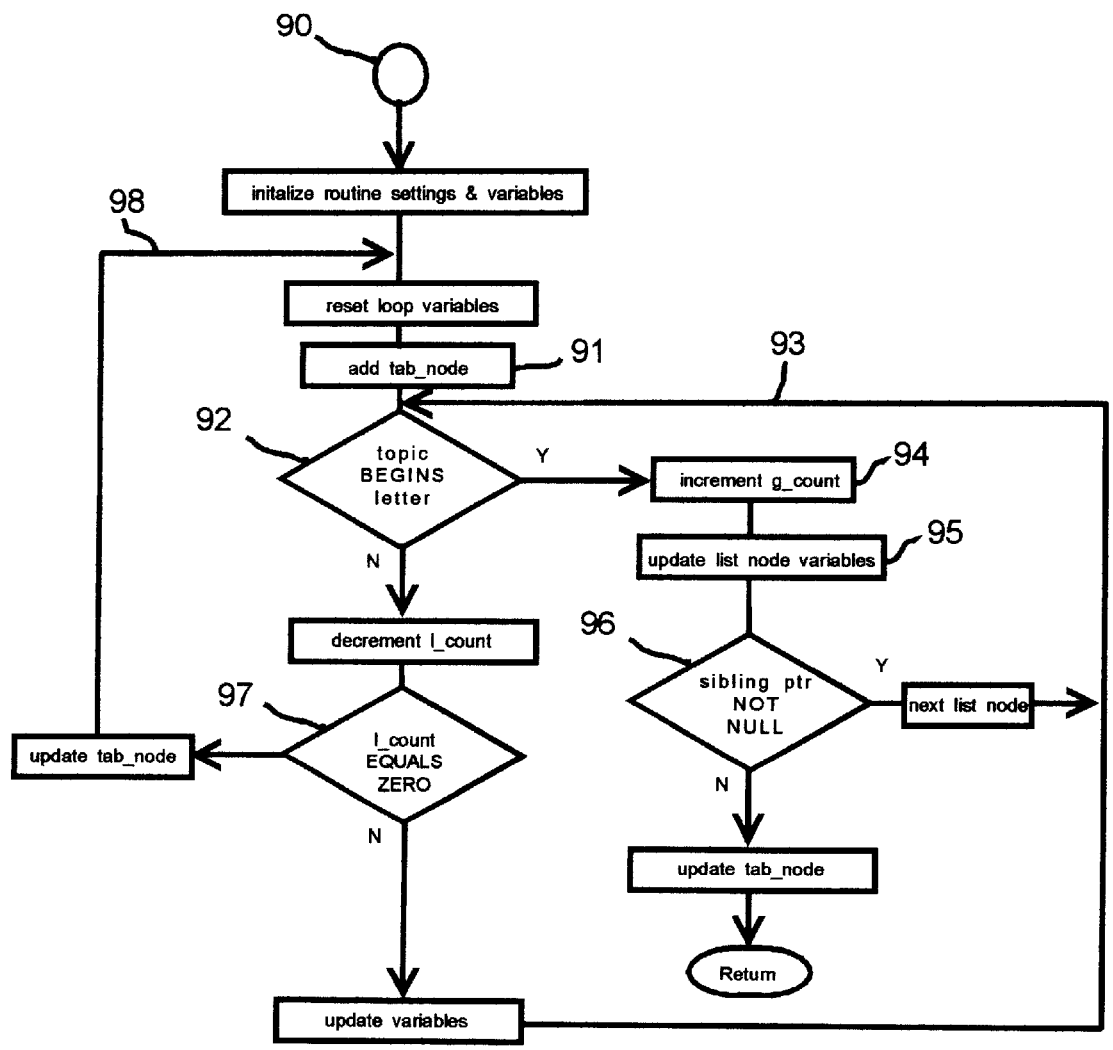
Figure 8C:
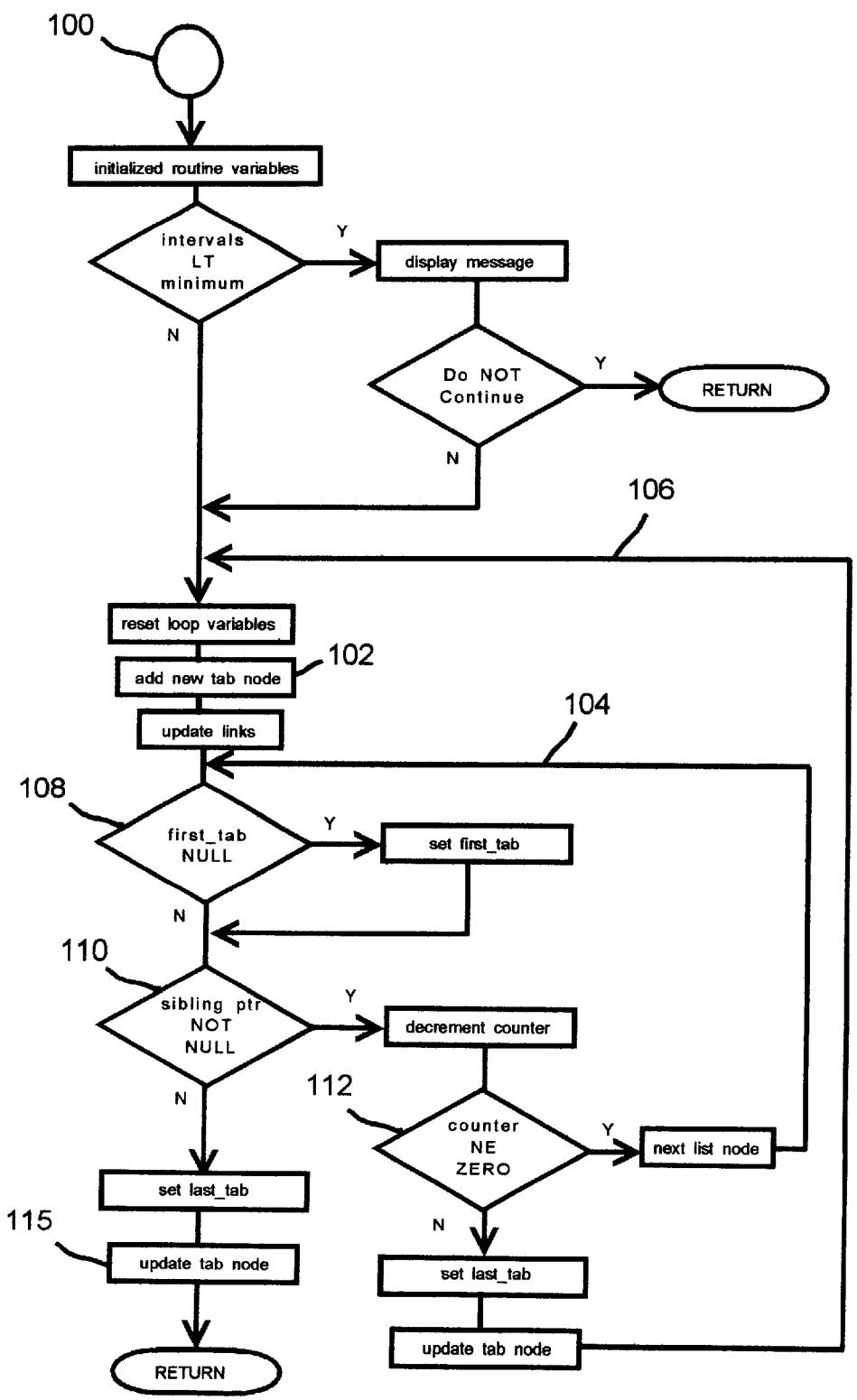

Finally, FIGS. 8a through 8c depict an embodiment of the program logic in the present invention used to generate a tab list menu in a menu structure like an open hierarchical data structure.

Routine 86, depicted in FIG. 8a, is an event-driven routine that is executed when Build Tabs button 81 is selected in configuration window 76. It depicts the main program driver that generates tab list menus for content menu 21. After fetching selected options from window 76 and initializing routine variables routine 86 calls either contentSource at 88 or alphaSource at 89. Upon return, control flows back to window 76 at 89.

The program logic of alphaSource routine 90 is depicted by FIG. 8b. Program control flows from routine 86 at 89 to 90. Routine 90 generates a tab list menu based on the alphabet. The number of letters in each tab is determined by the developer in window 76 in the Alphabet List source box in region 78.

In loop 93, routine 90 iterates through nodes in the target list to identify elements associated with the current alphabet tab. At 91 routine 90 adds a new tab entry in the tab list menu. Each time a member in the target list is encountered g_count is incremented at 94; this counter is used to display the number of elements in the offspring list. At 95, links in the target list are updated and the next sibling node is made current. When the sibling pointer is identified as null at 96, indicating the end of a target list, routine 90 updates the current tab node and returns to the calling routine.

Loop 98, controls the number of letters associated with each tab interval. Each time the first letter in a target node's topic is new, l_count is decremented. At 97, routine 90 checks l_count, the alphabet letter sequence length designated by the developer, to divert flow to loop 93 to continue with the same tab or 98 to start a new one, So a single letter setting would generate a new tab_node for each letter in the alphabet, and a four letter tab would generate ABCD, EFGH, and so on.

And lastly, contentSource routine 100, depicted in FIG. 8c, generates a tab list menu based on the target list menu and the interval size set by the developer. Upon entry, 100 initializes routine variables that calculate the interval size, handle topic sting construction, and manage links to update the target node list and the new tab list menu. Next, routine 100 checks the interval size and prompts the developer to continue if it is less than the designated minimum.

At the top of loop 106 routine 100 adds a new tab entry to the tab list in the menu structure. Loop 106 uses counter, a loop variable set to the calculated interval size, to iterate through the correct number of nodes in the target list. On the first pass it sets first_tab using the topic of the first node in the interval and the letter sequence size specified in window 76. If the current node has a sibling pointer the loop decrements counter. Each time the counter is greater than zero loop 104 uses the sibling pointer to fetch the next list node.

When the counter reaches zero program control flows to loop 106 and last_tab is set to the topic in the current node. Next loop 106 uses first_tab and last_tab to construct a tab topic and add it to the current tab node. Flow now s tarts back at the top of loop 106 where loop variables get reset and a new tab node is added to the menu structure.

At 110, routine 100 checks the current node in the target list for a null sibling pointer, signaling the last node. A null pointer causes program control to construct and add the last tab topic and return to the calling routine.

Conclusion

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

I claim:

1. A menu authoring system that enables a developer to generate a content-based tab list menu consisting of, displaying a tab list configuration interface, fetching a selection made by said developer from said tab list configuration interface that designates a target list in a hierarchical menu structure as a source of tab labels for said content-based tab list menu, fetching a setting made by said developer from said tab list configuration interface that represents a size factor in determining a sublist in said target list, creating said sublist from said target list in said hierarchical menu structure, creating a tab label from content in said sublist, creating said content-based tab list menu based on said tab label, linking said tab label in said content-based tab list menu to said sublist in said hierarchical menu structure.

2. The menu authoring system of claim 1 wherein is implemented in a computer program language that is compatible with at least one computer operating system.

3. The menu authoring system of claim 1 further includes displaying in said tab list configuration interface a navigation interface that enables said developer to navigate said hierarchical menu structure to select said target list.

4. The menu authoring system of claim 1 further includes displaying in said tab list configuration interface the number of entries in said target list menu in said hierarchical menu structure.

5. The menu authoring system of claim 1 further includes displaying in said tab list configuration interface an interface that enables said developer to specify different display options when creating said tab label.

6. The menu authoring system of claim 1 further includes displaying in said tab list configuration interface an interface that enables said developer to specify said factor size as a maximum number of items in said sublist.

7. The menu authoring system of claim 1 further includes displaying in said tab list configuration interface an interface that enables said developer to specify said size factor as a minimum number of items in said sublist.

8. The menu authoring system of claim 1 further includes the option of generating a tab list menu based on the alphabet sequence.

9. The menu authoring system of claim 1 further includes displaying the number of items associated with said tab label in said content-based tab list menu.

10. The menu authoring system of claim 1 further includes displaying in said tab list configuration interface said content-based tab list menu.

11. A menu authoring system that enables a developer to generate a tab list menu consisting of, the means for displaying a tab list configuration interface, the means for fetching a selection made by said developer from said tab list configuration interface that designates a target list in a hierarchical menu structure as a source of tab labels for said content-based tab list menu, the means for fetching a setting made by said developer from said tab list configuration interface that represents a size factor in determining a sublist in said target list, the means for creating said sublist from said target list in said hierarchical menu structure, the means for creating a tab label from content in said sublist, the means for creating said content-based tab list menu based on said tab label, the means for linking said tab label in said content-based tab list menu to said sublist in said hierarchical menu structure.

12. The menu authoring system of claim 11 wherein is implemented in a computer program language that is compatible with at least one computer operating system.

13. The menu authoring system of claim 11 further includes the means for displaying in said tab list configuration interface a navigation interface that enables said developer to navigate said hierarchical menu structure to select said target list.

14. The menu authoring system of claim 11 further includes the means for displaying in said tab list configuration interface the number of entries in said target list menu in said hierarchical menu structure.

15. The menu authoring system of claim 11 further includes the means for displaying in said tab list configuration interface an interface that enables said developer to specify different display options when creating said tab label.

16. The menu authoring system of claim 11 further includes the means for displaying in said tab list configuration interface an interface that enables said developer to specify said factor size as a maximum number of items in said sublist.

17. The menu authoring system of claim 11 further includes the means for displaying in said tab list configuration interface an interface that enables said developer to specify said size factor as a minimum number of items in said sublist.

18. The menu authoring system of claim 11 further includes the means for generating a tab list menu based on the alphabet sequence.

19. The menu authoring system of claim 11 further includes the means for displaying the number of items associated with said tab label in said content-based tab list menu.

20. The menu authoring system of claim 11 further includes the means for displaying in said tab list configuration interface said content-based tab list menu.

* * * * *